J. J. ROBINSON.
Churn.

No. 51,354. Patented Dec. 5, 1865.

WITNESSES

INVENTOR.

UNITED STATES PATENT OFFICE.

JAMES J. ROBINSON, OF CLINTON, ILLINOIS.

IMPROVEMENT IN CHURNS.

Specification forming part of Letters Patent No. 51,354, dated December 5, 1865.

*To all whom it may concern:*

Be it known that I, JAMES J. ROBINSON, of Clinton, in the county of De Witt and State of Illinois, have invented a new and useful Improvement in Churns; and I do hereby declare that the following is a full, clear, and exact description thereof, which will enable others skilled in the art to make and use the same, reference being had to the accompanying drawings, forming part of this specification, in which—

Figure 1:
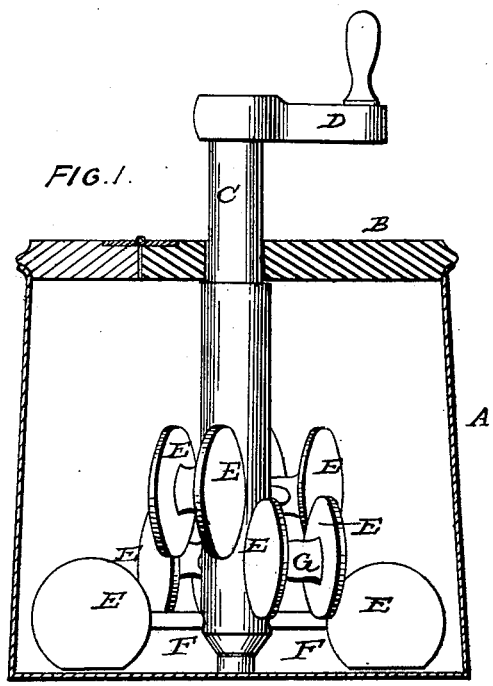
Figure 2:
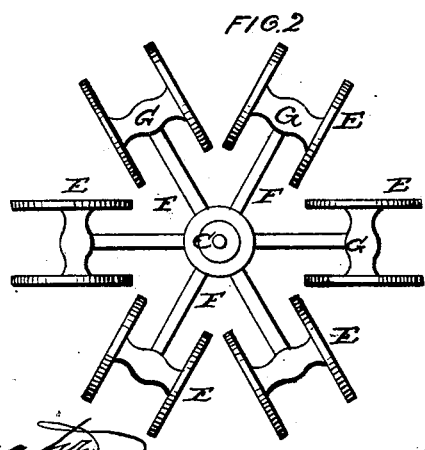

Figure 1 is a vertical section of a churn made according to my invention. Fig. 2 is a detailed view, in plan, of the dasher.

This invention has for its object to improve the ordinary churn by making its action in producing butter more rapid; and it consists in a novel construction of dasher, the same being composed of a series of wheels or disks coupled together from their centers in pairs and set outward around a vertical shaft at different heights in the churn. The disks are placed edgewise or vertically in the churn, and the revolution of the vertical shaft causes numerous eddies in the mass of milk and cream by reason of the passage of the disks through it.

A designates a vessel, which may be made of metal or of wood and of a height and capacity to be determined by the manufacturer. It has a hinged cover, B, through the center of which is passed a vertical shaft, C, that is stepped on the bottom of the vessel. The top of the shaft above the cover B has a crank, D, through which the shaft is turned.

To the lower part of shaft C, but at various heights thereon, is fixed a series of radial arms, F, of varying lengths. Each of these arms carries at its outer end a pair of disks, E, which disks are united in pairs by means of connecting pieces or shafts G, reaching from center to center of the disks, so that the disks of each pair are parallel with each other. The ends of the arms are directly connected to these connecting-pieces G, the latter being severally penetrated by one of the arms and securely fixed so as not to oscillate thereon. The said connecting pieces or shafts G are placed horizontally and parallel with the bottom of the vessel A, and consequently the disks E are vertical and their planes are at right angles to said bottom.

The several series of disks are arranged at such heights that the lower series just clears the bottom. The next series is placed midway of the height of the lower disks, and the next about half the height of the second series, and so on, if there are more than three series. The disks may be diminished in diameter as they go up.

Rotary motion being given to the shaft C the disks E will be carried around flatwise or facewise through the mass of milk and cream in the churn, and they will displace the same and leave a partial vacuum behind them, into which that part of the contents of the churn which is out of the path of the disks, as well as that which is above them, will rush with violence and be greatly agitated, and those parts will at the same time be violently beaten by the disk next behind, which, as it advances, strikes against the same and causes the particles or atoms containing butter to burst.

This mode of constructing and operating a churn greatly quickens the process of making butter.

I claim as new and desire to secure by Letters Patent—

In churns, making the dashers of a series of disks set in planes at right angles to the bottoms of the churns and supported on the ends of radial arms fixed on a vertical shaft within the churn, so that when the shaft is turned the faces of the disks advance against and through the contents of the churn, substantially as described.

JAMES J. ROBINSON.

Witnesses:
WILLIAM LAURY,
JOHN J. McGRAW.